United States Patent [19]

Ng et al.

[11] Patent Number: 5,604,527
[45] Date of Patent: Feb. 18, 1997

[54] DOT PRINTER AND METHOD FOR GREY LEVEL RECORDING WITH DIFFERENT BIT-DEPTH DIMENSIONS

[75] Inventors: Yee S. Ng, Fairport; Hieu T. Pham, Webster, both of N.Y.

[73] Assignee: Eastman Kodak Company, Rochester, N.Y.

[21] Appl. No.: 174,559

[22] Filed: Dec. 28, 1993

[51] Int. Cl.⁶ .................. B41J 2/47; B41J 2/435
[52] U.S. Cl. .......................... 347/240; 347/237
[58] Field of Search .................. 347/240, 237, 347/238, 131; 346/154; 358/298; 395/108, 109

[56] References Cited

U.S. PATENT DOCUMENTS

| | | |
|---|---|---|
| 3,850,517 | 11/1974 | Stephany et al. . |
| 4,746,941 | 5/1988 | Pham et al. . |
| 4,750,010 | 6/1988 | Ayers . |
| 4,799,071 | 1/1989 | Zeise et al. . |
| 4,821,066 | 4/1989 | Foote et al. . |
| 4,831,395 | 5/1989 | Pham et al. . |
| 4,855,760 | 8/1989 | Kanayama .............. 347/240 |
| 4,885,597 | 12/1989 | Tschang et al. . |
| 4,989,224 | 1/1991 | Narahara et al. . |
| 5,025,322 | 6/1991 | Ng . |
| 5,111,217 | 5/1992 | Zeise . |
| 5,253,934 | 10/1993 | Potucek et al. ........... 347/237 |
| 5,255,013 | 10/1993 | Ng et al. .................. 347/240 |
| 5,257,039 | 10/1993 | Chung et al. . |

FOREIGN PATENT DOCUMENTS

| | | |
|---|---|---|
| 2196498 | 4/1988 | United Kingdom . |
| WO91/10311 | of 0000 | WIPO . |

*Primary Examiner*—Benjamin R. Fuller
*Assistant Examiner*—Thinh Nguyen
*Attorney, Agent, or Firm*—Norman Rushefsky

[57] ABSTRACT

A non-impact recording apparatus for recording grey level exposures, the recording apparatus includes one or more recording elements such as LEDs. Image data signals of a predetermined multibits per pixel bit-depth dimension are generated by a data source along with a signal representing the predetermined bit-depth dimension. An exposure clock counter counts exposure clock pulses and outputs a count signal in response to clock pulses. The count signal represents a count value. A comparator compares a multibits-per-pixel image data signal with the count signal from the counter and generates a signal. A current driver is responsive to the signal from the comparator and controls a recording duration. Counting in the counter is adjusted in accordance with the multibits per pixel bit-depth dimension of the image data signal.

12 Claims, 5 Drawing Sheets

DOT PRINTER AND METHOD FOR GREY LEVEL RECORDING WITH DIFFERENT BIT-DEPTH DIMENSIONS

BACKGROUND OF THE INVENTION

1. Field of the Invention

The present invention relates to apparatus and methods of non-impact printing of halftone or continuous tone information and the like with small pixels (dots) that vary in grey level.

2. Description of the Prior Art

In the printing arts, various non-impact recording or printer heads for use as dot printers are known. Examples of such heads include an electrostatic printer head, an LED (light-emitting diode) array printer head, ink-jet printer head, thermal printer head, etc. While the invention will find utility with regard to non-impact printers in general, discussion will be made herein with regard to LED printer heads with which the invention is particularly suited.

In published International Application WO 91/10311, the contents of which are incorporated herein by this reference, an LED printer is described in which a series of LEDs arranged in a straight line are selectively activatable for brief periods to form a dot-like image on a recording surface. In the printer described in this patent, grey scale recording is achieved by having a digital comparator associated with each LED. At one input to the comparator, there is provided the data in the form of a plurality of digital data bits representing an exposure on-time for that LED for that PEL (picture element) recording period. At a second input to the comparator, an input from an up/down counter is provided that is rapidly changing in accordance with exposure clock signals emitted from a high speed clock. As the counter output value decreases towards zero at some point in time a match is sensed by the comparator between the two inputs of the comparator (in accordance with its operating criterion). The LED then turns on and remains on for a very brief duration until a subsequent sensing of a match by the comparator occurs during a count-up phase of the counter. In the above noted application "exposure space" is enhanced by providing a programmable clock whose periodicity changes within the counting cycle. That is, the exposure clock pulses can be said to be "non-linear". The gradations of exposure provided are more realistically related to human visual perception. The above application also notes that the data may be adjusted to provide also for exposure balancing of LED's. This is desirable where non-uniformity in illumination from LED to LED on the printer head may be expected.

A problem with the above is that certain printer systems are required to operate at high recording medium speeds. Where an 8-bit counter is used that counts 511 non-linear exposure clock counts for each line of pixels a problem arises as to providing sufficient time to finish the count before recommencing the counting process for recording the next line of pixels. In such printer systems only reasonable quality may be needed for printing information but an 8-bits per pixel bit-depth dimension may not be necessary. For example, a 6-bits per pixel bit-depth dimension may be satisfactory. On the other hand, other printer systems may be able to operate at slower recording medium speeds but require greater quality of continuous tone looking information and do require an 8-bits per pixel bit-depth dimension. As used herein, the term "bit-depth dimension" refers to the number of image data bits used in controlling duration of recording of a pixel or dot. In the example described herein with regard to a preferred embodiment, the bit-depth dimension refers to a corrected grey level image data signal and not just the grey level alone of the pixel to be recorded. Thus, for example, for a bit-depth dimension of 6-bits the number of grey levels for recording the pixel are 15 (not including no exposure) but 6-bits are used to define 15 assignable corrected exposure times from a set of 63 available times. Of course in a system where no correction is considered necessary, bit-depth dimension may equate directly to grey level image data.

SUMMARY OF THE INVENTION

It is therefore an object of the invention to overcome the problem set forth above. This and other objects which will become apparent after reading the following detailed description are realized by a non-impact recording apparatus for recording grey level exposures, the recording apparatus comprising: a recording element; means for generating image data signals of a predetermined multibits per pixel bit-depth dimension; means for generating a signal representing the predetermined bit-depth dimension; an exposure clock counter means for counting exposure clock pulses and outputting a count signal in response to said clock pulses said count signal representing a count value; comparator means for comparing a multibits-per-pixel image data signal with the count signal from said counter means and generating a signal; means responsive to said signal from said comparator means for controlling the recording element to control a recording duration; and means responsive to said signal representing the predetermined bit-depth dimension for adjusting counting in said counter means in accordance with the multibits per pixel bit-depth dimension of said image data signal.

The invention is further realized by a method for non-impact recording of grey level exposures, the method comprising the steps of: counting exposure clock pulses in a counter and outputting a count signal in response to said clock pulses, said count signal representing a count value; comparing a multibits-per-pixel image data signal with the count signal and generating a timing signal in response to said signal controlling a recording element for a recording duration; and adjusting counting in said counter means in accordance with the multibits per pixel bit-depth dimension of said image data signal.

In accordance with another aspect of the invention, there is provided a non-impact printhead for recording grey level exposures, the printhead comprising: a recording element; means for storing image data signals of a predetermined multibits per pixel bit-depth dimension; means for receiving a signal representing the predetermined bit-depth dimension; an exposure clock counter means for counting exposure clock pulses and outputting a count signal in response to said clock pulses said count signal representing a count value; comparator means for comparing a multibits-per-pixel image data signal with the count signal from said counter means and generating a signal; means responsive to said signal from said comparator means for controlling the recording element to control a recording duration; and means responsive to said signal representing the predetermined bit-depth dimension for adjusting counting in said counter means in accordance with the multibits per pixel bit-depth dimension.

In accordance with still another aspect of the invention, there is provided a driver chip for use in a non-impact printhead for recording grey level exposures, the driver chip comprising: means for storing image data signals of a predetermined multibits per pixel bit-depth dimension; means for receiving a signal representing the predetermined bit-depth dimension; an exposure clock counter means for counting exposure clock pulses and outputting a count signal in response to said clock pulses said count signal representing a count value; comparator means for comparing a multibits-per-pixel image data signal with the count signal from said counter means and generating a signal; means responsive to said signal from said comparator means for controlling the recording element to control a recording duration; and means responsive to said signal representing the predetermined bit-depth dimension for adjusting counting in said counter means in accordance with the multibits per pixel bit-depth dimension.

DESCRIPTION OF THE DRAWINGS

In the detailed description of the preferred embodiments of the invention presented below, reference is made of the accompanying drawings in which.

DESCRIPTION OF THE PREFERRED EMBODIMENTS

Because apparatus of the type described herein are well known, the present description will be directed in particular to elements forming part of, or cooperating more directly with, the present invention.

Figure 1:
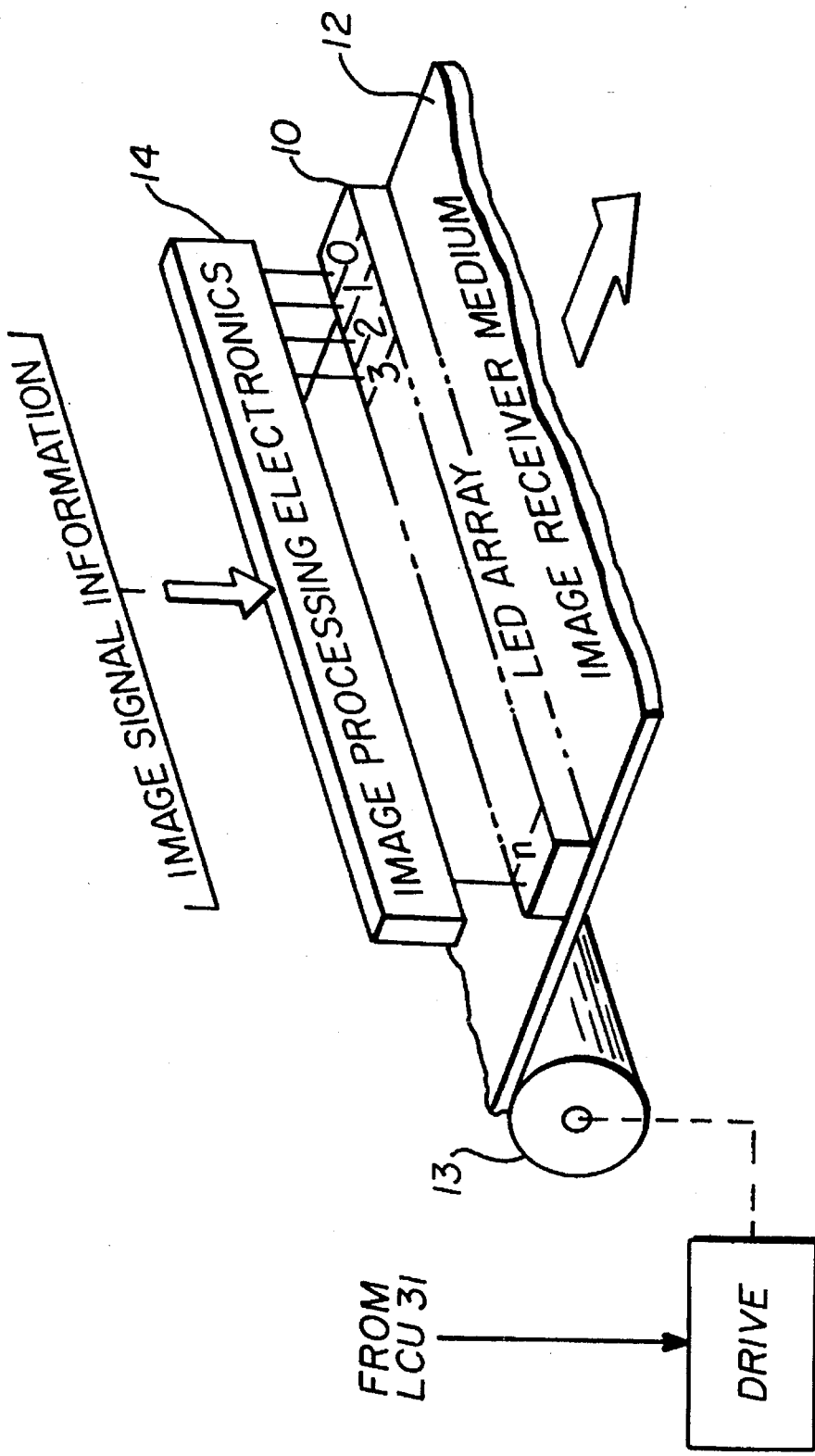
FIG. 1 is a perspective view illustrating the general arrangement of a non-impact printer as used in the embodiment of the invention and as known in the prior art.

The apparatus for the herein disclosed invention is typified by the diagram of FIG. 1; a linear array 10 of say 3584 triggerable recording elements or radiation sources; e.g. LEDs, is disposed to expose selectively a photosensitive image-receiver medium 12 that is movable relative to the array by suitable conventional means such as a drive roller 13 that is driven by a mechanical drive or motor whose speed is controlled by signals from a logic and control unit 31. Optical means for focusing the LEDs onto the medium may also be provided. In this regard, gradient index optical fiber devices such as Selfoc (trademark of Nippon Sheet Glass Co., Ltd.) arrays are highly suited. The LEDs of the array are triggered into operation by means of image processing electronics 14 that are responsive to image signal information. Depending on the duration for which any given LED is turned on, the exposure effected by such LED is more or less made. Where the medium 12 is, say photographic film the latent image formed line by line by selective exposure of said LEDs may be subsequently developed by conventional means to form a visible image. Where the medium 12 is an electrophotographic receptor, the LEDs may be used to form an electrostatic image on a uniformly electrostatically charged photoconductor and this image developed using colored or pigmented toner particles and perhaps transferred to a copy sheet, see U.S. Pat. No. 3,850,517, the contents of which are incorporated herein.

Figure 2:
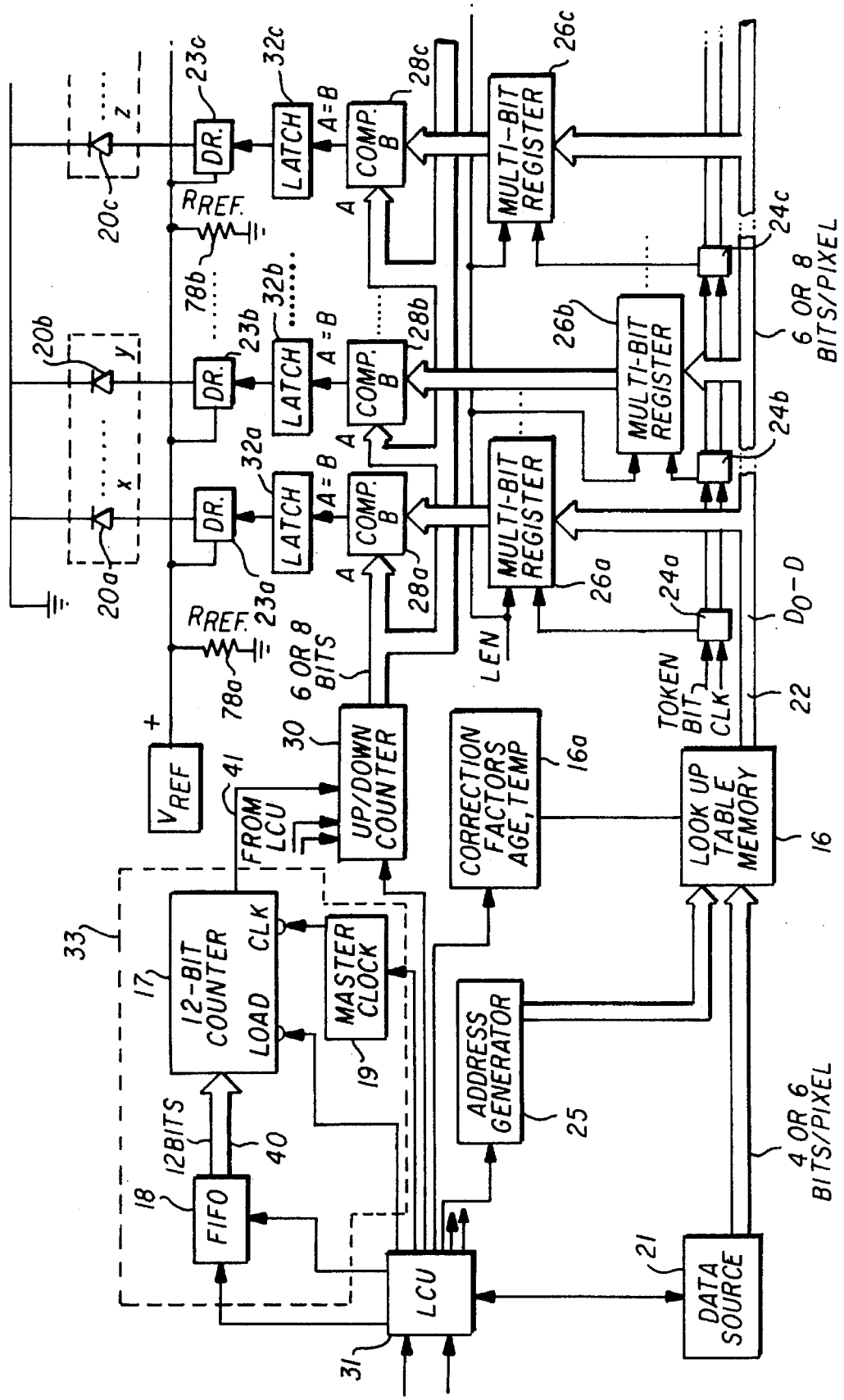
FIG. 2 is a schematic of a printer circuit for recording grey scale information in accordance with the invention.

With reference now to FIG. 2, a circuit is shown which may be used for triggering selectively the LED's 20a, 20b, 20c, etc. that together comprise the array 10. Only the associated driver circuitry for driving these three LEDs are shown for clarity purposes, it being understood that the circuitry for driving such other LEDs is similar to that described for driving the illustrated examples. While the figure shows all the driver circuitry associated with the LED's located to one side of the line of LEDs it is well known to place these driver circuits on both sides of the line of LEDs to provide more efficient utilization of space. Typically, the driver circuits are integrated circuits that contain driver circuitry for driving say 32 or 64 LEDs.

Data to be printed for each line is in the form of binary digital signals, e.g., 1's and 0's. This data on lines labeled $D_0$–$D_7$ are outputted in parallel onto the data bus 22 from a look-up table memory 16. While the data will be referred to as being of 8 bits size, it will be understood that in another mode it is 6 bits in size. The inputs to the table memory 16 comprise either a 4-bit or 6-bit uncorrected data signal from a data source 21 and a signal from an address generator 25 identifying an address in table memory 16 where the correction characteristics are stored of the particular LED to print that data signal. The data source 21 may comprise one data source that handles data of different bit-depth dimensions or two different data sources of different bit-depth dimensions or the printer may be adjusted for the bit-depth dimension of the data source. Typical data sources include raster image processors which process data from computers, and scanners which generate signals from sensing of data on documents. The data on lines of D0–D7 comprises, in this example, a corrected 8-bit data signal representing an exposure time count for a particular LED for printing a single grey level recorded dot. There is synchronously generated with these signals with the logic and control unit (LCU) 31 a token bit signal which is a single-bit binary signal that is shifted down a shift register formed by a plurality of individual registers 24a, 24b, 24c, etc. Each such register 24 is associated with a particular LED as is a circuit structure identified as a multibit register 26a, 26b, 26c, etc. This token bit determines to which of the LED's a particular set of data on bus 22 is intended. In operation, a series of 8-bit data signals are provided on bus 22 and one 8-bit signal is latched by each of the 3584 multibit registers 26 associated with each LED. The latching being in response to the presence of the token bit in the particular register 24. Further description relative to a circuit for selectively latching data of this type is provided in U.S. Pat. No. 4,746,941, entitled "Dot Printer with Token Bit Selection Data Latching," the contents of which are incorporated herein by this reference. After an 8-bit data signal is stored in each of the multibit registers 26, a latch enable (LED) signal is provided by the LCU 31 to shift this 8-bit signal to an output stage or latch of each register so that an 8-bit level data signal (say decimal 10 for LED 20 for this particular PEL period) is output to one input terminal (B) of a respective digital comparator 28a, 28b, 28c, etc. associated with each LED. At this point in time digital counters 30 (one for each driver chip) are enabled by LCU 31 to count down, in this particular example, from decimal 255 to 0. The counters 30 are up/down counters which is a term used herein to define also a counter that operates in a down and then up counting modes. The output of each of the counters 30 are 8-bit signals, in this example. $C_0$–$C_7$ represent in digital form numbers or count values which change periodically in accordance with exposure clock pulses from a programmable exposure clock 33. With each pulse (or trailing edge of same) from exposure clock 33, the counter 30 changes the count at its outputs. The outputs of counter 30 are input to the input terminal (A) of the digital comparators 28. The comparator 28 for each LED now compares the signals at its respective A and B inputs in accordance with the comparator's criteria for operation; i,e. is A equal B? During the count-down mode of the counters when the count by the counter 30 and inputted at terminal A is equal to a respective input data signal at terminal B (the count can be any number between 1 and 255 ), the output of a respective comparator goes to a digital logic high level and is latched at a respective latch register 32. The latched signal allows driver 37 to be enabled at the rising edge of the next clock pulse from the programmable or variable clock 33, to commence and maintain current respectively to an LED 20. After counter 30 counts down to zero, the counter 30 is either reset by the next clock pulse into a count-up mode or inhibited from counting additional clock pulses for a minimum respective period $T_{MIN}$ that is programmed into each counter or provided by other suitable means. In one embodiment, the duration of $T_{MIN}$ may be from a count of "1" in the down counting mode to a counter of "1" in the up counting mode. After this predetermined time period $T_{MIN}$, the count is set to count in their count-up modes and commence counting clock pulses again. When the output of counter 30 in its count-up mode reaches say a number stored in the terminal B of comparator 28 and meeting an appropriate criterion for comparison, the output of comparator 28 changes and a respective latch of the latches 32a, 32b, 32c, etc. is reset and current to the LED 20 ceases. The other LEDs 20 operate in similar fashion but their data will require different count values to turn on and off in accordance with grey scale data provided in their respective multibit registers and respective counters selected. In this embodiment the LED's may be initially "balanced" such as by adjusting a "trim" resistor 78a, 78b, etc. associated with each driver chip, see U.S. Pat. No. 4,831,395, the contents of which are incorporated herein by this reference. Other known techniques for balancing output of the recording elements may also be provided. See, for example, U.S. Pat. Nos. 4,885,597 and 5,257,039. In addition, further balancing or correction for unequal light output is provided by adjustment of the data in accordance with the characteristics of each LED. Thus, the memory device such as a programmable read-only memory device or PROM such as look-up table memory 16 stores the characteristics of each LED and data for that LED can be modified such as by correction factors for age and temperature provided by a table memory 16a to provide an input count at terminal B that represents data modified by the exposure characteristics of the LED. For example, for an LED that is a relatively strong light emitter the look-up table memory 16 in response to an address generator 25 representing an identity of an LED would modify data bits for that LED to change the 6-bit grey level signal from data source 21 to a corrected 8-bit signal that is device dependent, i.e. takes into account the characteristics of the recording element.

While in the preferred embodiment the clocks that are employed are programmable clocks as described below and in the aforementioned International Application the invention in its broader aspects is not so limited.

Description will now be provided relative to a circuit 33 for generating clock pulses that change with a varying periodicity. A memory device such as a first-in, first-out (FIFO) memory 18 is loaded in this example with a respective 12-bit number that is provided, for example, by a serial signal from LCU 31. These respective 12-bit numbers are output in parallel over lines 40 from FIFO 18 and input to a 12-bit counter 17 that includes a comparator means. At the beginning of a PEL (picture element) recording period the counter 17 is reset by a respective signal from LCU 31 and in response to a synchronizing signal from LCU 31 commences to count clock pulses from master clock 19. Upon reaching the respective 12-bit count provided at its input, the counter 17 emits a single pulse and resets itself to repeat this operation. Alternatively, the counter may be reset to the 12-bit count that is input thereto and count down to zero and emits a single pulse over line 41 that serves as an exposure clock pulse. If the 12-bit number at its input remains unchanged counter 17 will emit a series of pulses equally spaced in time. However, it is preferred to have an exposure clock pulse that emits pulses nonlinearly with time or partially linear in time so that increased exposure space is available. Thus, in a partially linear exposure clock space, the output of clock 33 are groups of serial clock pulses wherein in each group the respective pulses are say uniformly spaced. The spacing between exposure clock pulses is directly related to the respective 12-bit number or clock coefficient output 40 from FIFO memory device 18. As one example, FIFO memory 18 may have input thereto, from LCU 31, 127 clock coefficients. As the exposure clock pulses may be created with groups of uniformly spaced pulses, some of the coefficients are the same so that after counting to the 12-bit number and emitting a single variable clock pulse the counter 33 receives the next 12-bit number which may be the same as the previous 12-bit number. These 12-bit numbers thus establish the periodicity of the pulses from exposure clock 33, and thus allow for exposure clock pulses that change nonlinearly with time. Other examples of nonlinear clocks are known and may be used such as one disclosed in commonly assigned U.S. application Ser. No. 07/807,522.

In the discussion provided above, it was noted that the data source 21 provided grey level data information having 4 or 6-bits per pixel while the data passed along to data bus $D_0-D_7$ was 6 or 8-bits per pixel. As may be noted in FIG. 2, the data source 21 output is input to a lookup table memory device 16 along with an address provided by the address generator 25. The address generator points to the location in memory device 16 thereof where data is stored for each particular LED. Thus, a table of memory is provided for each LED and indicates for this LED a corresponding exposure time for each grey level it is to print. It is this exposure time which is a 6 or 8-bit digital number that is output as data onto data bus $D_0-D_7$. The 6-bit number is output in response to a 4-bit data signal from data source 21 and the 8-bit number is output in response to a 6-bit data signal from data source 21. It should be understood that the specific examples provided herein are exemplary that the data may not need to be corrected for recording elements that are generally more uniform as emitters or the data may be corrected by different bit depths than that described herein.

While the 8-bits per pixel signal ($D_0-D_7$) represents exposure information corrected for nonuniformities of the LED's, it is recognized that during use of the printhead nonuniformities arise due to different aging of the LEDs or due to differences in temperature. Aging differences are created when some LEDs are used more than others during the course of different print jobs. In U.S. Pat. No. 4,799,071, it is proposed to minimize the aging differences by activating underused LED's during periods of non-use of the printer for printing a print job or otherwise correcting for non-uniformities based on differences in aging as the printhead is being used. Thus, factors such as those based on environmental considerations and/or usage may be accommodated by providing updated entries automatically from a correction calculator 16a to look-up table memory 16.

Also, the data signal $D_0$–$D_7$ may be a different number for count down than for count-up. This may be accomplished by sending out a 12-bit data signal prior to each PEL recording period with 6-bits used for countdown and 6-bits used for count-up or 6-bits may be shifted prior to the PEL period and 6-bits shifted during a $T_{MIN}$ period between count-down and count-up. The up-down counter may be replaced with a unidirectional counter with suitable means provided to determine when to start and stop counting. In this regard, start and stop registers are provided to store respective counts. Reference is also made to U.S. Pat. No. 5,111,217 wherein different count frequencies are used during the count up and count down counting modes.

Description will now be provided of a preferred embodiment of an up-down counter 30 that provides for a variable bit-depth dimension exposure clock counter. Thus, the counter is capable of adjusting for reset into an up-counting mode after 255 exposure clock pulses in the 8-bit corrected image data mode and after 63 exposure clock pulses in the 6-bit corrected image data mode.

Figure 3:
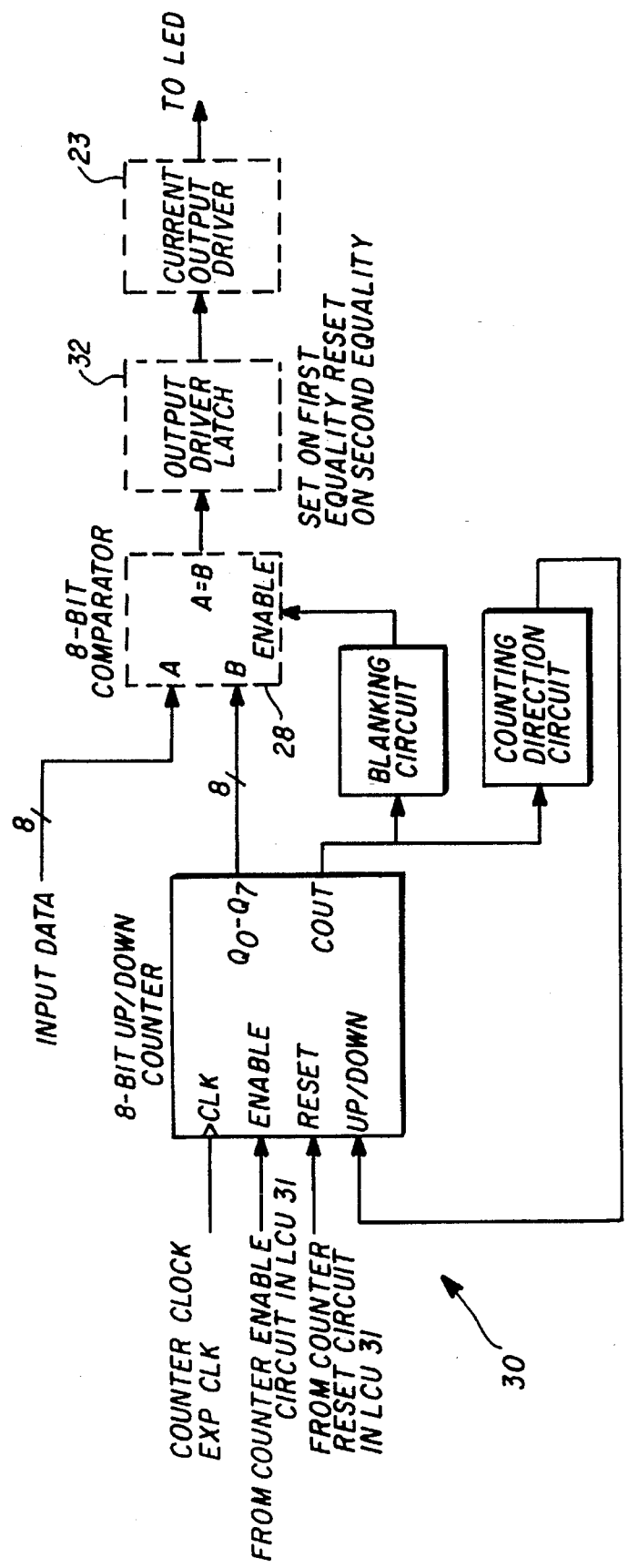
FIG. 3 is a block diagram of the counter of the invention shown cooperating with elements of one driver channel for controlling duration to a recording element such as an LED.
Figure 4:
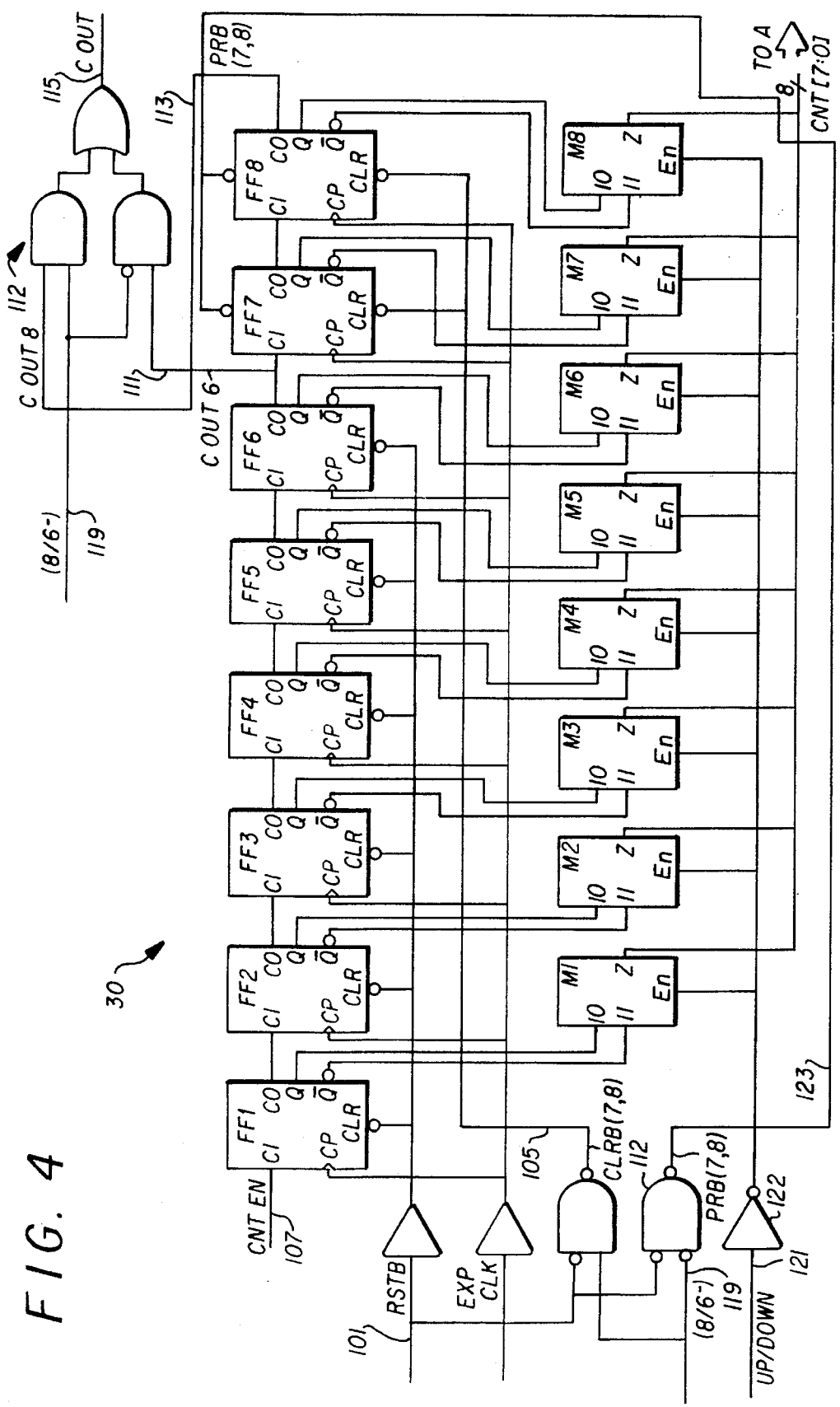
FIG. 4 is a schematic of a variable bit-depth dimension up-down counter of FIG. 3 that is used in the printer circuit of FIG. 2 for recording grey scale information in accordance with the invention.
Figure 5:
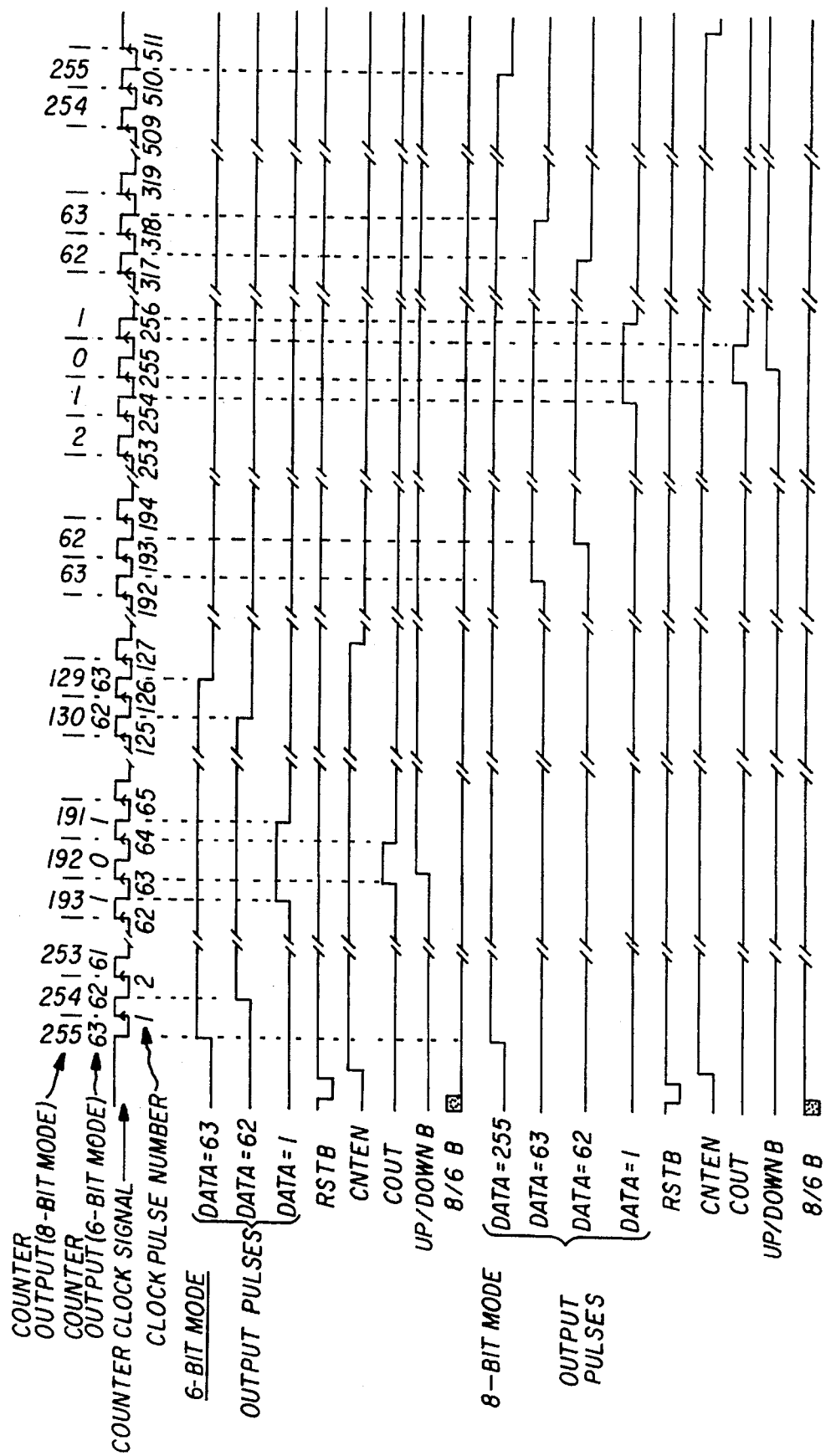
FIG. 5 is a timing diagram illustrating operation of the output of the counter of FIG. 4.

With reference to FIGS. 3 and 4 and the timing diagram of FIG. 5, a six-stage synchronous counter (FF1–FF6) and a two-stage synchronous counter (FF7 and FF8) are provided. The respective $\overline{Q}$ outputs of the six-stage counter represent a six-bit count-down mode count while the Q outputs represent a six-bits count-up mode. The combined eight stages are used for an 8-bits counter with the $\overline{Q}$ outputs used in the down-counting mode and the Q outputs used in the up-count mode. A reset (RSTB) signal (active when low) on line 101 is used to clear flip flops (FF1–FF6) while the flip-flops FF7 and FF8 are cleared by a logic output CLRB (7, 8) signal (active when low) on line 105 from NAND gate 110. The CLRB (7, 8) signal is generated in response to the reset signal on line 101 being low and the 8/6-selection signal on line 119 being high to indicate that the 8-bits per pixel mode is selected. An "up/down" input signal on line 121 will, through inverter 122, enable multiplexers (M1–M8) to either go into an up-count or down-count mode. When the "up/down" input is high, the output of the multiplexers represents an upward-counting code and when the "up/down" input is low, the output of the multiplexers represents a downward-counting mode. Note the multiplexers output merely reflects a selection of one of the two of the Q, $\overline{Q}$ inputs of each of the flip flops FF1–FF8. The parallel outputs of the multiplexers (CNT[7:02]) represent an 8-bit count that is input to terminal A of the comparators 28 in the driver downstream from the up/down counter. When the counter enable signal (CNT EN) on line 107 asserts itself after the reset signal, the flip flops are waiting for the exposure clock pulses (EPCLK) entering on line 109 for counting. The CNT EN signal is active when high and the logic and control unit controls the CNT EN signal such that it is active for 511 EPCLK pulses in the 8-bits per pixel mode and 127 EPCLK pulses in the 6-bits per pixel mode. The respective carry-out signals output at the carry out terminal (CO) of the flip flops (FF1–FF8) are connected from FF1 through FF8. The carry-out signals are active when high. The output of FF6 is Cout6 on line 111 and the output of FF8 is Cout8 on line 113. Cout6 and Cout8 also are used to generate the signal Cout to set the up/down counter in a count-up mode at a counter count equal to zero. The signals Cout 6 and Cout 8 are combined with logic combination 112 that also has at one of its inputs a selection signal 8/6–on line 111 which determines whether the counter is in an 8-bit or a 6-bit counter mode. When in a 6-bit mode and the 6-bit counter output represented by FF1–FF6's $\overline{Q}$ outputs are zero, the carry out (CO) output of FF6 is high and causes the up/down logic level on line 21 to toggle directly after Cout is active so that the multiplexers M1–M6 or M1–M8, depending on 8 or 6-bits selection, is now in an up-counting mode.

The Q, $\overline{Q}$ outputs of the flip flops FF1–FF8 are connected to the inputs ( 10 and 11 ) of the multiplexers M1–M8. One of these outputs is chosen to be presented at the output (Z) of a respective one of the multiplexers (M1–M8) depending on whether we are counting up or down in a center pulse width modulation scheme. An input bit depth selection pin (8/6–) denoted as line is coupled not only with the reset (RSTB) signal to generate via NAND gate 110 a clear signal for flip flops FF-7 and FF-8 (CLRB(7,8) but also generates on line 123 a preload signal (PRB(7,8)) via NAND gate 112 for FF-7 and FF-8. The clear lines (CLR) of FF7 and FF8 are separated from that of the other six flip flops (FF1–FF6) which are still cleared by signal RSTB. If an 8-bits per pixel function is chosen as indicated by the signal on line 119, signal CLRB(7,8) is set by incoming signal RSTB but the preload signal (PRB(7,8)) for FF7 and FF8 is not generated. The flip flop portion of the up/down counter then functions as an 8-bit counter. But if the 6-bits per pixel function is chosen, then signal CLRB (7,8) is not generated by the reset signal RSTB, but a preload signal on line 123 (PRB(7,8)) is generated for FF7 and FF8. So in the case of the 6-bits per pixel mode, FF1–FF6 are cleared by reset signal RSTB but FF7 and FF8 are preloaded. On the output side of the carry, Cout6 (from FF6) and Cout8 (from FF8) are combined by logic device 112 with the bit depth selection pin (8/6–) to give the output Cout on line 115. When the system is at the 8-bits per pixel mode, Cout 8 is passed to the output as Cout. In the 6-bits mode, Cout is passed to the output as Cout. Therefore, with the selection of either 8 bits/pixel or 6-bits/pixel selection pin, we can use the same driver for an 8-bits or 6-bits system.

A modification of this system may include using function bits to select the (8-6–) pin instead of using a pad. The advantage may include getting more than two-bit depth selection via the multiplexing scheme for the functional bit. Also, it is possible to modify the existing system to have more than the two-bit depth selections in a similar manner described here.

While the master clock 19 has been described as producing clock pulses at regular intervals which are counted by the 12-bit counter, it is contemplated that this master clock will also be programmable so that while still emitting regular clock pulses, the time period between such regular clock pulses may be adjusted. Such adjustability may be provided by coupling the master clock 19 to the LCU so that either inputs by an operator or through automatic operation signals from the LCU to the master clock 19 can adjust the period between master clock pulses as may be needed for color printing or other process control such as contrast.

Thus, in color printing, for example using well known electrophotographic reproduction apparatus, for example, see U.S. Pat. No. 4,821,066, the contents of which are incorporated herein by this reference, successive separate image frames on a photoconductor are exposed with color separation images to be developed, respectively, with cyan, magenta and yellow toners. The developed image frames are then transferred in register to a copy sheet. In modulating the electrostatic charge on each image frame with the printing apparatus described herein to form the color separation images the variability of master clock 19 can prove useful. The clock pulse period from adjustable master clock 19 may be adjusted automatically for creating exposures on one color image frame, say cyan, to the next color image frame, say that for producing the magenta image. Adjustability of master clocks 19 in combination with the variable programmable clock signals from programmable clock 33 provides for a very efficient and flexible control of exposure. In the example provided above for color reproduction, it is contemplated that the duration of each master clock pulse period used for printing one color separation image frame will differ by a few percent from that used in printing a different color separation image frame to provide the fine control for exposure time.

While the invention has been described in a specific example with reference to a six-stage and two-stage count registers, it will be apparent that generally an n-stage count register and an m-stage count register may be used wherein m and n are each whole numbers greater than one. In additon, other counters of variable bit depth may be used.

There has thus been described a method and apparatus for dot printing wherein a clocking scheme is employed for generating clocked exposure pulses for forming pixels that is capable of being operated at different bit levels or dimensions per pixel and thus is capable of use with high speed printer systems not requiring very high quality reproductions and with low speed printer systems that are required to provide high quality reproductions. The up-down counter 30, data registers 26, comparators 28, latches 32 and current drivers 23 may be incorporated on an integrated driver circuit chip. Plural integrated driver circuit chips and LED chip arrays are then mounted on a printhead support as is well known.

The invention has been described in detail with particular reference to preferred embodiments thereof, but it will be understood that variations and modifications can be effected within the spirit and scope of the invention.

We claim:

1. A non-impact recording apparatus for recording grey level exposures of pixels with different bit-depth dimension, the recording apparatus comprising:

a recording element;

means for providing first image data signals of a first predetermined multibits per pixel bit-depth dimension and for providing second image data signals of a second predetermined multibits per pixel bit-depth dimension;

means for providing a third signal representing the first bit-depth dimension and for providing a fourth signal representing the second bit-depth dimension;

an exposure clock counter means for counting exposure clock pulses and outputting a count signal in response to said clock pulses, said count signal representing a count value, said counter means being an up/down counter having a down and up-counting modes;

adjusting means responsive to said third signal for adjusting counting in said counter means in accordance with the multibits per pixel bit-depth dimension of said first image data signals to provide count values associated with the first bit-depth dimension and responsive to said fourth signal for adjusting counting in said counter means in accordance with the multibits per pixel bit-depth dimension of said second image data signals to provide count values associated with the second bit-depth dimension;

comparator means for comparing a multibits-per-pixel image dam signal with the count signal from said counter means and generating a signal; and means responsive to said signal from said comparator means for controlling the recording element to control a recording duration.

2. The apparatus of claim 1 and wherein the counter means includes an n-stage count register and an m-stage count register wherein m and n are each whole numbers greater than one and said adjusting means generates a signal for switching between the down and up counting modes in accordance with the signal representing a current bit-depth dimension of operation.

3. The apparatus of claim 2 and including multiplexer means connected to the outputs of the n-stage and m-stage registers for outputting a combined count value.

4. A method for non-impact recording of grey level pixels, the method comprising the steps of:

providing image data representing a pixel to be recorded, the image data for each pixel in one image being represented by signals having a first bit-depth dimension, and the image data for each pixel in a second image being represented by signals having a second bit-depth dimension, the first and second bit-depth dimensions being each greater than one and of different dimensions;

generating exposure clock pulses for timing an exposure duration;

counting exposure clock pulses in a counter and outputting a count signal in response to said clock pulses, said count signal representing a count value, said counter counting in down and up-counting modes;

adjusting a bit-depth dimension of said count signal output by said counter in accordance with the first or the second bit-depth dimension of said image data signal;

comparing a multibits-per-pixel image data signal with the count signal and generating a timing signal; and in response to said timing signal controlling a recording element for a recording duration.

5. The method of claim 4 and wherein the counter includes an n-stage count register and an m-stage count register wherein m and n are each whole numbers greater than one and in the step of adjusting counting there is generated a signal for switching between the down and up counting modes in accordance with the signal representing a current bit-depth dimension of operation.

6. The method of claim 5 and wherein outputs of the n-stage and m-stage registers are multiplexed for outputting a combined count value.

7. A non-impact printhead for recording grey level exposures, the printhead comprising:

a recording element;

means for storing image data signals of either a first or a second multibits per pixel bit-depth dimension;

means for receiving exposure clock pulses;

an up/down exposure clock counter means having down and up-counting modes for counting the exposure clock pulses and outputting a count signal representing a count value in response to said clock pulses, said counter means being operational in a first mode wherein a count signal is output by the counter means as a multibit signal having a first bit-depth dimension and in a second mode wherein a count signal is output by the counter means as a multibit signal having a second bit-depth dimension different than said first bit-depth dimension;

means connected to said counter means for receiving a first signal for selecting either a first or a second operating mode of the counter means;

means responsive to the first signal representing a selection of a bit-depth dimension for adjusting counting in said counter means in accordance with the multibits per pixel bit-depth dimension of the image data signals so that the bit-depth dimension of the counter means is identical to that of the image data signals.

comparator means for comparing a multibits-per-pixel image data signal with the count signal from said counter means and generating a second signal; and means responsive to the second signal from said comparator means for controlling the recording element to control a recording duration.

8. The printhead of claim 7 and wherein the counter means includes an n-stage count register and an m-stage count register wherein m and n are each whole numbers greater than one and said means for adjusting counting generates a signal for switching between the down and up counting modes in accordance with the signal representing a current bit-depth dimension of operation.

9. The printhead of claim 8 and including multiplexer means connected to the outputs of the n-stage and m-stage registers for outputting a combined count value.

10. A driver chip for driving a recording element on a non-impact printhead for recording grey level exposures, the driver chip comprising:

means for storing image data signals of either a first or a second multibits per pixel bit-depth dimension;

means for receiving exposure clock pulses;

an up/down exposure clock counter means having down and up-counting modes for counting the exposure clock pulses and outputting a count signal representing a count value in response to said clock pulses, said counter means being operational in a first mode wherein a count signal is output by the counter means as a multibit signal having a first bit-depth dimension and in a second mode wherein a count signal is output by the counter means as a multibit signal having a second bit-depth dimension different than said first bit-depth dimension;

means responsive to the first signal representing a selection of a bit-depth dimension for adjusting counting in said counter means in accordance with the multibits per pixel bit-depth dimension of the image data signals so that the bit-depth dimension of the counter means is the same as that of the image data signals;

means connected to said counter means for receiving a first signal for selecting either a first or the second operating mode of the counter means;

comparator means for comparing a multibits-per-pixel image data signal with the count signal from said counter means and generating a second signal; and means responsive to the second signal from said comparator means for controlling the recording element to control a recording duration.

11. The driver chip of claim 10 and wherein the counter means includes an n-stage count register and an m-stage count register wherein m and n are each whole numbers greater than one and said means for adjusting counting generates a signal for switching between the down and up counting modes in accordance with the signal representing a current bit-depth dimension of operation.

12. The driver chip of claim 11 and including multiplexer means connected to the outputs of the n-stage and m-stage registers for outputting a combined count value.

* * * * *